US012797949B2

(12) United States Patent
Wang et al.

(10) Patent No.: US 12,797,949 B2
(45) Date of Patent: Nov. 17, 2026

(54) FULLY AUTOMATIC PRESS

(71) Applicant: Baigida Intelligent Technology (Ningbo) Co., Ltd., Ningbo (CN)

(72) Inventors: Xingjie Wang, Ningbo (CN); Niansheng Zhou, Ningbo (CN); Xiongpeng Zhu, Ningbo (CN); Hao Zhu, Ningbo (CN); Kaixuan Yu, Ningbo (CN); Lei Zhang, Ningbo (CN); Jian Cao, Ningbo (CN); Kai Xu, Ningbo (CN); Jianfeng Xin, Ningbo (CN); Keqi Zheng, Ningbo (CN)

(73) Assignee: Baigida Intelligent Technology (Ningbo) Co., Ltd., Ningbo (CN)

( * ) Notice: Subject to any disclaimer, the term of this patent is extended or adjusted under 35 U.S.C. 154(b) by 162 days.

(21) Appl. No.: 18/818,677

(22) Filed: Aug. 29, 2024

(65) Prior Publication Data

US 2025/0345851 A1 Nov. 13, 2025

(51) Int. Cl.

| | |
|---|---|
| ***B22F 3/03*** | (2006.01) |
| ***B22F 3/00*** | (2021.01) |
| ***B30B 15/30*** | (2006.01) |

(52) U.S. Cl.

CPC ................ *B22F 3/03* (2013.01); *B22F 3/004* (2013.01); *B30B 15/304* (2013.01)

(58) Field of Classification Search

CPC .. B22F 3/03; B22F 3/004; B30B 15/022–024; B30B 15/302–308; B29C 43/006

See application file for complete search history.

(56) References Cited

FOREIGN PATENT DOCUMENTS

| | | | | | |
|---|---|---|---|---|---|
| CN | 104174844 A | * | 12/2014 | | |
| CN | 106583718 A | * | 4/2017 | .............. | B22F 3/003 |
| CN | 113043445 A | * | 6/2021 | ......... | B28B 17/0072 |
| CN | 114838793 A | * | 8/2022 | ............. | G01G 13/08 |
| WO | WO-2009003507 A1 | * | 1/2009 | ........... | B28B 13/025 |

* cited by examiner

*Primary Examiner* — Seyed Masoud Malekzadeh
*Assistant Examiner* — Vipul Malik

(57) ABSTRACT

The invention discloses a fully automatic press, and relates to the technical field of powder metallurgy. The fully automatic press comprises a frame, a powder weighing device, a powder conveying device, a powder feeding device and a forming device. The invention solves the problems of low powder weighing efficiency, unsatisfying release agent spraying effect and collisions of a powder conveying device of presses in the prior art.

8 Claims, 11 Drawing Sheets

1000

FULLY AUTOMATIC PRESS

BACKGROUND OF THE INVENTION

1. Technical Field

The invention relates to the technical field of powder metallurgy, and particularly relates to a fully automatic press.

2. Description of Related Art

Powder metallurgy is a processing method for forming parts by pressing powder placed in a mold and is generally used for forming resin and metal parts. Fully automatic presses are equipment for powder pressing.

An existing fully automatic press comprises a frame, wherein a powder weighing device, a powder conveying device, a powder feeding device and a forming device are arranged in the frame, metal powder enters the powder weighing device first by means of a feed cylinder, and a fixed quantity of powder is weighed by the powder weighing device and then fed into the powder feeding device. The powder feeding device is pushed by the powder conveying device to the forming device; when the powder conveying device moves to the forming device, a release agent spraying device in linkage with the powder conveying device sprays a release agent to a mold in the forming device to facilitate demolding after a workpiece is formed; and then, the powder is fed by the powder feeding device into the forming device to be pressed.

Existing presses have some limitations in use. For example, the powder weighing device of the existing presses can only weigh powder in one hopper each time, so the powder weighing efficiency is low and cannot satisfy requirements; moreover, the release agent spraying mechanism is generally fixed to the powder conveying device and cannot adjust the release agent spraying effect according to the actual production condition, so the release agent spraying effect is limited; in addition, the powder feeding device of the existing presses discharges powder by vibration which is generated by a vibration mechanism, and frequent collisions of the powder feeding device will be caused due to errors of the powder feeding device during processing, thus affecting normal powder discharging and shortening the service life of the powder feeding device.

BRIEF SUMMARY OF THE INVENTION

To solve the problems of low powder weighing efficiency, unsatisfying release agent spraying effect and collisions of the powder conveying device of presses in the prior art, the invention provides a fully automatic press.

The above technical purpose of the invention is fulfilled by the following technical solution:

The invention provides a fully automatic press, comprising a frame, a powder weighing device, a powder conveying device, a powder feeding device and a forming device, wherein the powder weighing device, the powder conveying device, the powder feeding device and the forming device are all arranged on the frame;

the powder weighing device comprises a powder feeding mechanism, powder weighing mechanisms and a powder discharge pipe; the powder feeding mechanism comprises at least two feed pipes and at least two feed hoppers, and the feed pipes are connected to the feed hoppers in one-to-one correspondence; the number of the powder weighing mechanisms is the same as the number of the feed hoppers, feed ports are formed in ends, away from the feed pipes, of the feed hoppers, and the feed ports are located above the powder weighing mechanisms in one-to-one correspondence;

the powder discharge pipe is arranged between the powder weighing mechanisms, the powder feeding device is arranged below the powder discharge pipe, and each powder weighing mechanism is able to correspondingly pour powder into the powder feeding device by means of the powder discharge pipe; the powder conveying device travels on the frame to move the powder feeding device to the forming device, and the forming device is used for receiving powder from the powder feeding device and pressing the received powder.

In this solution, according to the fully automatic press, a fixed quantity of powder is weighed by the powder weighing device and fed into the powder feeding device, and the powder conveying device drives the powder feeding device to move to form the forming device, and powder is fed by the powder feeding device into the forming device to be pressed. Wherein, powder is fed into the powder weighing mechanisms sequentially by means of the feed pipes and the feed hoppers of the powder feeding mechanism, and the powder weighing mechanisms weigh the powder and then feed the weighed powder into the powder feeding device by means of the powder discharge pipe, such that a fixed quantity of powder is weighed. Wherein, at least two feed pipes and at least two feed hoppers are arranged and connected in one-to-one correspondence, and the powder weighing mechanisms are in one-to-one correspondence with the feed hoppers, such that powder can be fed into at least two powder feeding mechanisms by means of at least two feed pipes and at least two feed hoppers, thus improving powder weighing efficiency. The powder discharge pipe is arranged between the powder weighing mechanisms to allow the powder weighing mechanisms to pour powder into the powder feeding device, and two or more powder weighing mechanisms can share one powder feeding device, that is, when one powder weighing mechanism pours powder into the powder feeding device, the other powder weighing mechanism receives powder from the corresponding feed hopper, such that the powder weighing device can weigh powder continuously, thus improving processing efficiency.

Further, ends, away from the feed hoppers, of the feed pipes are connected to a discharge pipe, a discharge port is formed in an upper end of the discharge pipe, and the discharge pipe is externally connected to a vibration motor; each feed pipe comprises a first pipe section and a second pipe section which are connected from top to the bottom, the first pipe section is connected to the discharge pipe and inclines downward in a direction away from the discharge pipe, the second pipe section is arranged vertically, and the corresponding feed hopper is connected to a bottom of the second pipe section.

In this solution, the ends, away from the feed hoppers, of the two feed pipes (upper ends of the feed pipes) are connected to the discharge pipe, and powder can be fed into multiple feed pipes by means of the same discharge pipe. The discharge pipe is externally connected to a vibration motor, and under the action of vibrations generated in operation of the vibration motor, powder can smoothly enter the feed pipes from the discharge pipe.

Further, a powder blocking mechanism is arranged at each feed port and comprises a front powder blocking plate, a lower powder blocking plate and a blocking plate driving component, the front powder blocking plate surrounds the feed port of the corresponding feed hopper and defines an opening facing downward, the lower powder blocking plate is arranged below the front powder blocking plate, and the blocking plate driving component is connected to the lower powder blocking plate and is able to drive the lower powder blocking plate to move with respect to the front powder blocking plate to open or close the opening below the front powder blocking plate.

In this solution, the powder blocking mechanism is arranged at each feed port, and after the powder weighing mechanisms weigh sufficient powder, the powder blocking mechanisms block the feed ports to allow the powder weighing mechanisms to pour the powder into the powder feeding device. Wherein the front powder blocking plate surrounds the corresponding feed port to block powder in front, and the lower powder blocking plate is arranged below the front powder blocking plate to block powder from below, and the front powder blocking plate and the lower powder blocking plate work together to block the corresponding feed port. The blocking plate driving component can drive the lower powder blocking plate to move with respect to the front powder blocking plate to open or close the opening below the front powder blocking plate so as to open or close the corresponding feed port.

Further, the blocking plate driving component comprises a push cylinder, a support frame is arranged below each feed hopper, and a cylinder body of the push cylinder is fixed to the corresponding support frame; the lower powder blocking plate is hinged to a piston rod of the push cylinder, and the push cylinder is able to push the lower powder blocking plate to stretch out of the corresponding support frame;

the powder blocking mechanism further comprises a powder blocking screen plate, which is driven by a vertical cylinder to be vertically and movably arranged at the corresponding feed port, and multiple screen holes are formed in the powder blocking screen plate.

In this solution, the push cylinders are fixed to the support frames, and when the piston rods of the push cylinders reciprocate to push the lower powder blocking plates to stretch out of the support frames, the support frames will rotate around hinge joints between the lower powder blocking plates and the piston rods under the action of gravity to open the openings below the front powder blocking plates, and at this moment, powder can flow into the powder weighing mechanisms from the feed hoppers. By opening the lower powder blocking plates in this way, powder is unlikely to be accumulated on the lower powder blocking plates, thus guaranteeing the weighing accuracy of the powder weighing mechanisms. Wherein, the powder blocking screen plates at the feed ports are vertically driven by the vertical cylinders to screen powder flowing out from the feed hoppers to prevent large-sized powder from directly falling onto the powder weighing mechanisms, such that the weighing accuracy of the powder weighing mechanisms will not be affected. When the screen holes of the powder blocking screen plates are blocked, the powder blocking screen plates can be driven by the vertical cylinders to ascend to be away from the feed ports so as to be cleaned.

Further, each powder weighing mechanism comprises a weighing box, a base and a turning cylinder, a cylinder body of the turning cylinder is hinged to the base, and a piston rod of the turning cylinder is hinged to the weighing box;

the base is provided with a base plate inclining downward in a direction away from the powder discharge pipe, and the weighing box is hinged to the base plate; an opening is formed in an end, away from the turning cylinder, of the weighing box, and the powder discharge pipe is arranged below the opening of the weighing box.

In this solution, the powder weighing mechanism weighs powder by means of the weighing box, the cylinder body of the turning cylinder is hinged to the base, the piston rod of the turning cylinder is hinged to the weighing box, and the weighing box is hinged to the base plate on the base. In this way, after the weighing box weighs sufficient powder, the piston rod of the turning cylinder stretches out to drive the weighing box to rotate around the base plate, such that powder in the weighing box flows from the end, provided with the opening, of the weighing box into the powder feeding device. Wherein, the base plate inclines downward in a direction away from the powder discharge pipe, such that the weighing box is oblique when placed on the base plate; and the opening of the weighing box inclines upward, such that powder is unlikely to flow out via the opening of the weighing box when weighed in the weighing box.

Further, the powder conveying device comprises release agent sprayers, a driving mechanism and a trolley track, the powder feeding device comprises a feeding trolley, a slider matched with the trolley track is arranged at a bottom of the feeding trolley, and the driving mechanism is connected to the feeding trolley and drives the feeding trolley to move linearly; the release agent sprayers are arranged on the feeding trolley and face downward; a mounting bracket is connected to a front side of the feeding trolley, a lifting mechanism is arranged on the mounting bracket, and the lifting mechanism is connected to the release agent sprayers and able to drive the release agent sprayers to move vertically.

In this solution, the feeding trolley of the feeding device is driven by the driving mechanisms to move along the trolley track to convey powder to the forming device. The release agent sprayers are arranged on the feeding trolley and face downwards, and the lifting mechanism is connected to the release agent sprayers and can drive the release agent sprayers to move vertically to adjust the height of the release agent sprayers so as to adjust the release agent spraying range, thus improving the release agent spraying effect.

Further, a lower side plate is arranged on a lower side of the mounting bracket and connected to a side, away from the feeding trolley, of the mounting bracket, a front end plate and wool felt are arranged at an end, away from the feeding trolley, of the lower side plate, a lower end of the front end plate is flush with the track below the feeding trolley, and the wool felt is fixed to a side, away from the lower side plate, of the front end plate.

In this solution, the lower side plate is arranged on the lower side of the mounting bracket, and the front end plate and the wool felt are connected to the end, away from the feeding trolley, of the lower side plate, such that the front end plate and the wool felt can remove powder spilling onto the trolley track when the feeding trolley moves, thus guaranteeing the sanitary environment of the fully automatic press and the moving stability of the feeding trolley.

Further, the feeding trolley comprises a feeding box frame, a powder bin, a trolley vibration mechanism and a pressing mechanism; a receiving cavity for receiving powder is formed in the powder bin, and a notch is formed in a lower side of the feeding box frame; the powder bin, the trolley vibration mechanism and the pressing mechanism are all mounted in the feeding box frame, a lower portion of the powder bin is fitted and mounted in the notch in the lower side of the feeding box frame, the trolley vibration mechanism is connected to the powder bin and drives the powder bin to vibrate, and the pressing mechanism is connected to the powder bin and provides a downward pressure for the powder bin.

In this solution, the powder bin of the feeding trolley is used for containing powder, the powder bin, the trolley vibration mechanism and the pressing mechanism are integrated in the feeding box frame, and the trolley vibration mechanism is connected to the powder bin and can drive the powder bin to vibrate, such that powder can smoothly enter the forming device from the powder bin; and the pressing mechanism is connected to the powder bin and presses the powder bin to allow the lower portion of the powder bin to be stably fitted in the notch in the lower side of the feeding box frame, such that the powder bin is unlikely to collide with the feeding box frame when vibrating.

Further, a lower seam is circumferentially arranged on a lower portion of the powder bin and limited above the notch of the feeding box frame, and a flexible sealing ring is circumferentially inlaid in the lower seam and abuts against an edge of the lower seam and an edge of the notch of the feeding box frame.

In this solution, the lower seam is circumferentially arranged on the lower portion of the powder bin and works together with the notch of the feeding box frame to realize tight fit between the powder bin and the feeding box frame; the flexible sealing ring is inlaid in the lower seam and abuts against the edge of the lower seam and the edge of the notch of the feeding box frame, such that a shock absorption and buffer effect can be fulfilled when the powder bin vibrates, and powder spilling out of the powder bin is unlikely to enter the lower seam and the notch of the feeding box frame and thus will not affect the fit between the powder bin and the feeding box frame.

Further, a mounting groove is formed in the slider, a shock absorption assembly is mounted in the mounting groove and comprises a spring plunger and an abutting head, a plunger head of the spring plunger abuts against an inner side of the abutting head, and at least part of the abutting head is able to stretch out of the mounting groove and is driven by the spring plunger to abut against an inner wall of the trolley track.

In this solution, the spring plunger and the abutting head are arranged in the mounting groove in the slider, and the spring plunger drives the abutting head to abut the inner wall of the trolley track, such that when the powder bin vibrates, the shock absorption assembly can buffer collisions between the feeding trolley and the trolley track, thus reducing abrasion of the feeding trolley and the trolley track.

To sum up, the invention has the following beneficial effects:

According to the fully automatic press provided by the invention, the powder weighing device is provided with at least two powder weighing mechanisms, at least two feed hoppers and at least two feed pipes, and the two powder weighing mechanisms can synchronously or separately weigh powder, thus improving powder weighing efficiency; the release agent sprayers arranged on the feeding trolly can be driven by the lifting mechanism to ascend or descend, such that the spraying effect of the release agent sprayers can be adjusted; and the powder bin is pressed in the feeding box frame by the pressing mechanism, such that collisions between the powder bin and the feeding box frame can be reduced when the powder bin vibrates.

1000, fully automatic press; 100, frame; 200, powder weighing device; 210, powder feeding mechanism; 211, feed pipe; 2111, first pipe section; 2112, second pipe section; 2113, pneumatic butterfly valve; 212, feed hopper; 2121, feed port; 213, discharge pipe; 2131, discharge port; 214, vibration motor; 215, feeding vibration mechanism; 220, powder weighing mechanism; 221, weighing box; 222, base; 223, turning cylinder; 224, base plate; 225, weighing sensor; 230, powder discharge pipe; 240, powder blocking mechanism; 241, front powder blocking plate; 242, lower powder blocking plate; 243, push cylinder; 244, support frame; 245, powder blocking screen plate; 2451, screen hole; 300, powder conveying device; 310, release agent sprayer; 320, driving mechanism; 330, trolley track; 340, mounting bracket; 341, lower side plate; 342, front end plate; 343, wool felt; 350, lifting mechanism; 360, extension arm; 370, pneumatic claw; 380, clamping arm; 400, feeding trolley; 410, slider; 411, mounting groove; 420, feeding box frame; 430, powder bin; 431, flexible sealing ring; 432, lower seam; 440, trolley vibration mechanism; 450, pressing mechanism; 460, shock absorption assembly; 461, spring plunger; 462, abutting head; 500, forming device; 510, upper electric cylinder; 520, upper guide plate; 530, upper mold; 540, forming mold; 550, lower mold; 560, lower guide plate; 570, lower electric cylinder; 600, conveying mechanism; 700, glove box.

DETAILED DESCRIPTION OF THE INVENTION

The invention is further described below in conjunction with the accompanying drawings.

Figure 1:
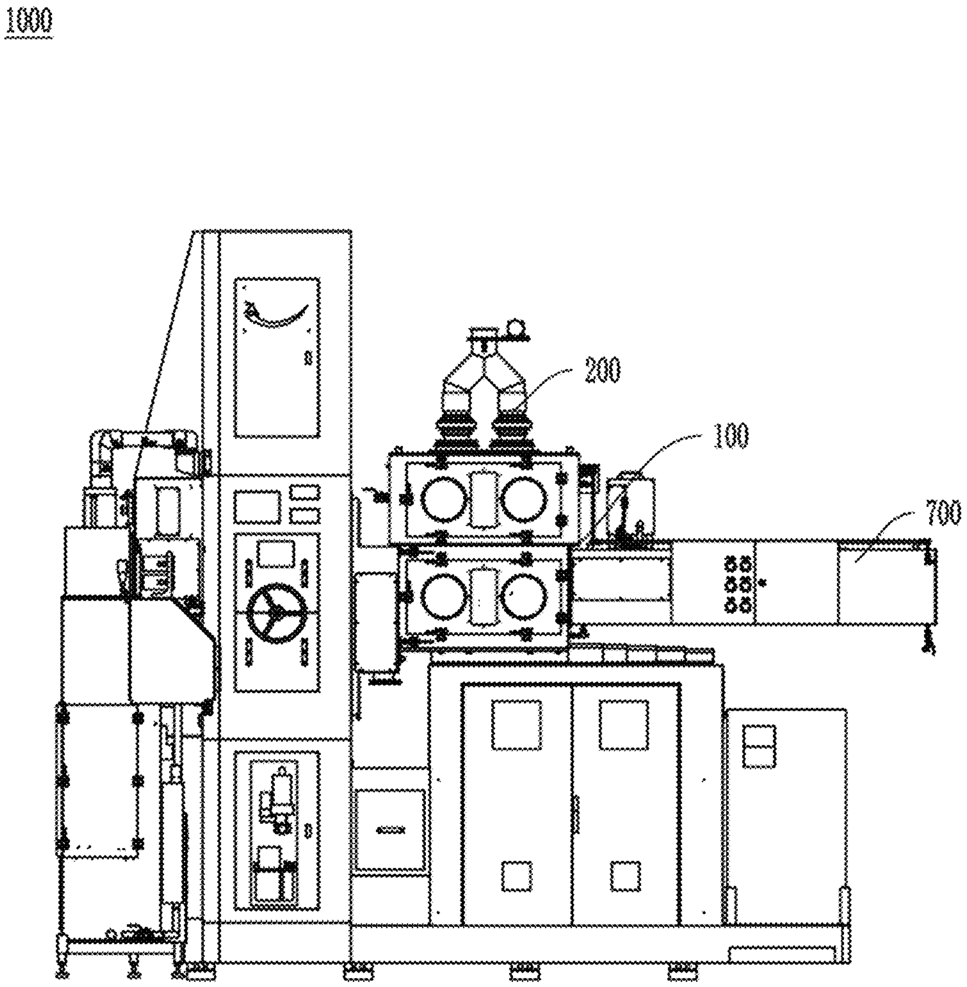
FIG. 1 is a schematic front structural view of a fully automatic press according to one embodiment of the invention.
Figure 2:
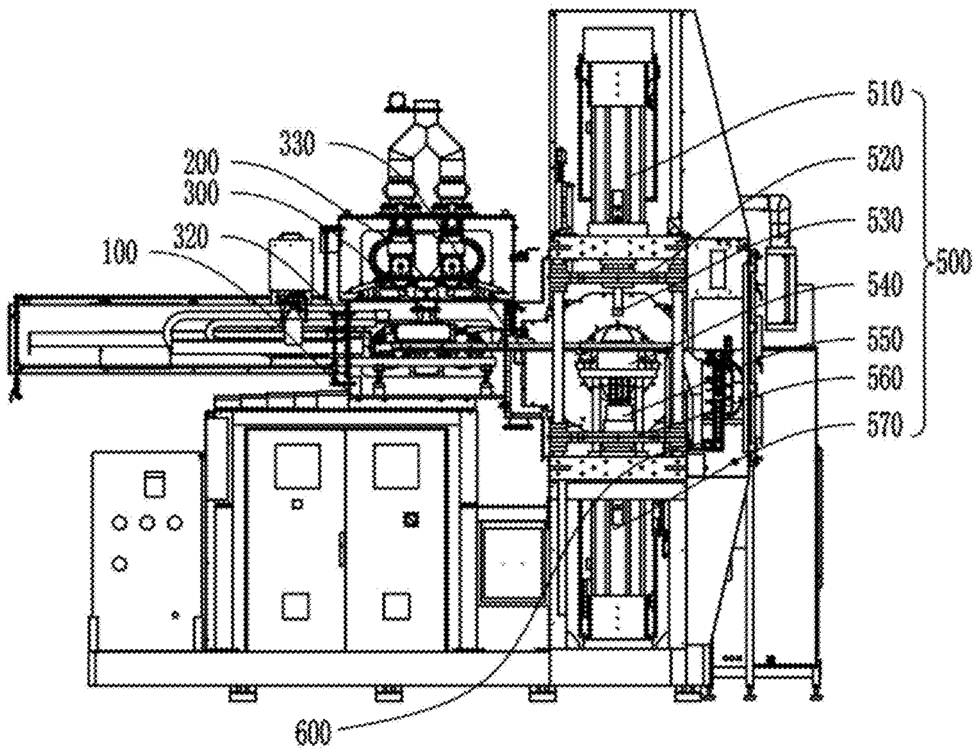
FIG. 2 is a schematic internal structural view of the fully automatic press according to one embodiment of the invention.

This embodiment discloses a fully automatic press 1000. Referring to FIGS. 1 and 2, the fully automatic press 1000 comprises a frame 100, a powder weighing device 200, a powder conveying device 300, a powder feeding device and a forming device 500, wherein the powder weighing device 200, the powder conveying device 300, the powder feeding device and the forming device 500 are all arranged on the frame 100. According to the fully automatic press 1000, a fixed quantity of powder is weighed by the powder weighing device 200 and then fed into the powder feeding device, the powder conveying device 300 drives the powder feeding device to move to the forming device 500, and the powder is fed by the powder feeding device into the forming device 500 to be pressed.

Figure 3:
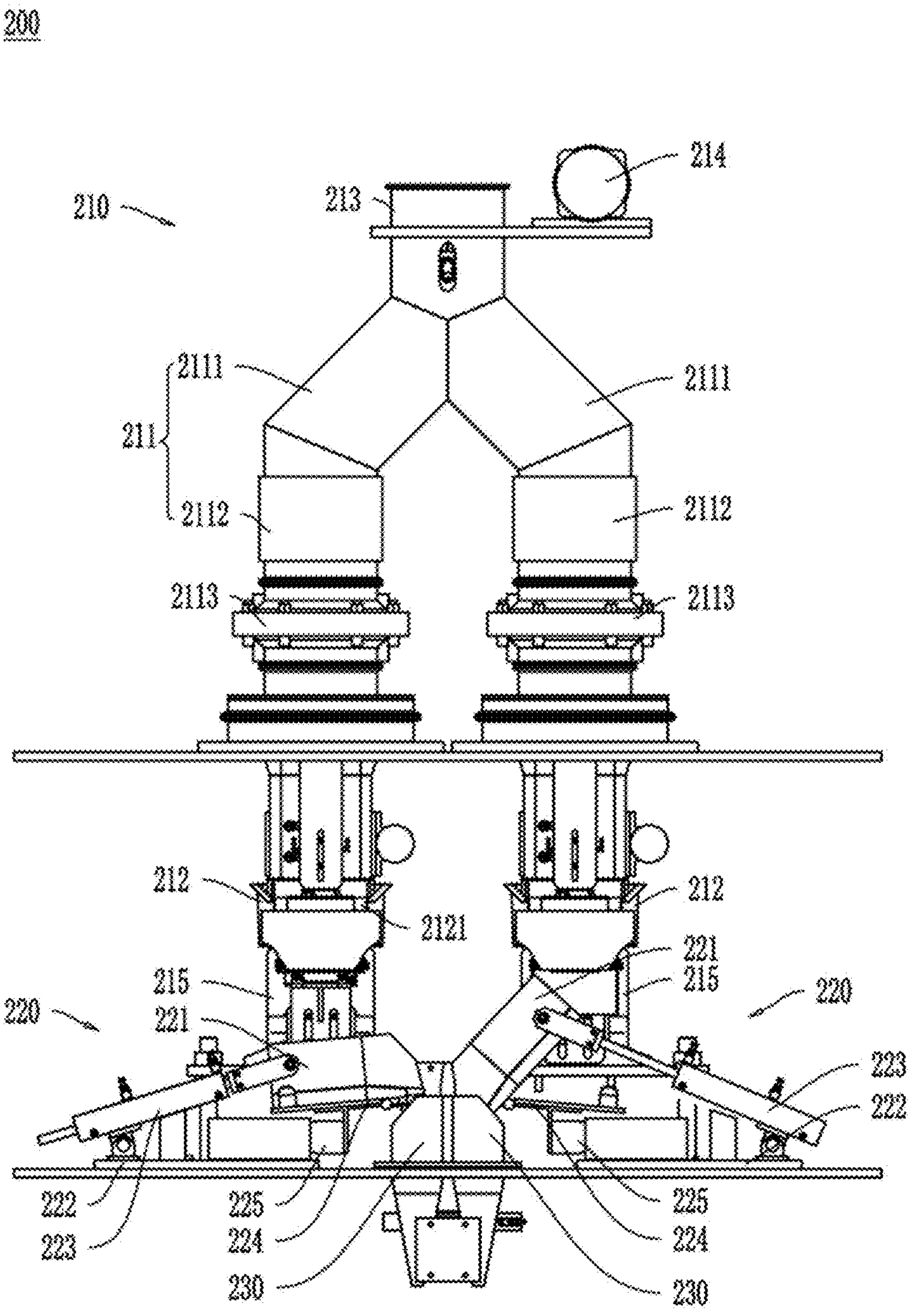
FIG. 3 is a schematic front structural view of a powder weighing device according to one embodiment of the invention.
Figure 4:
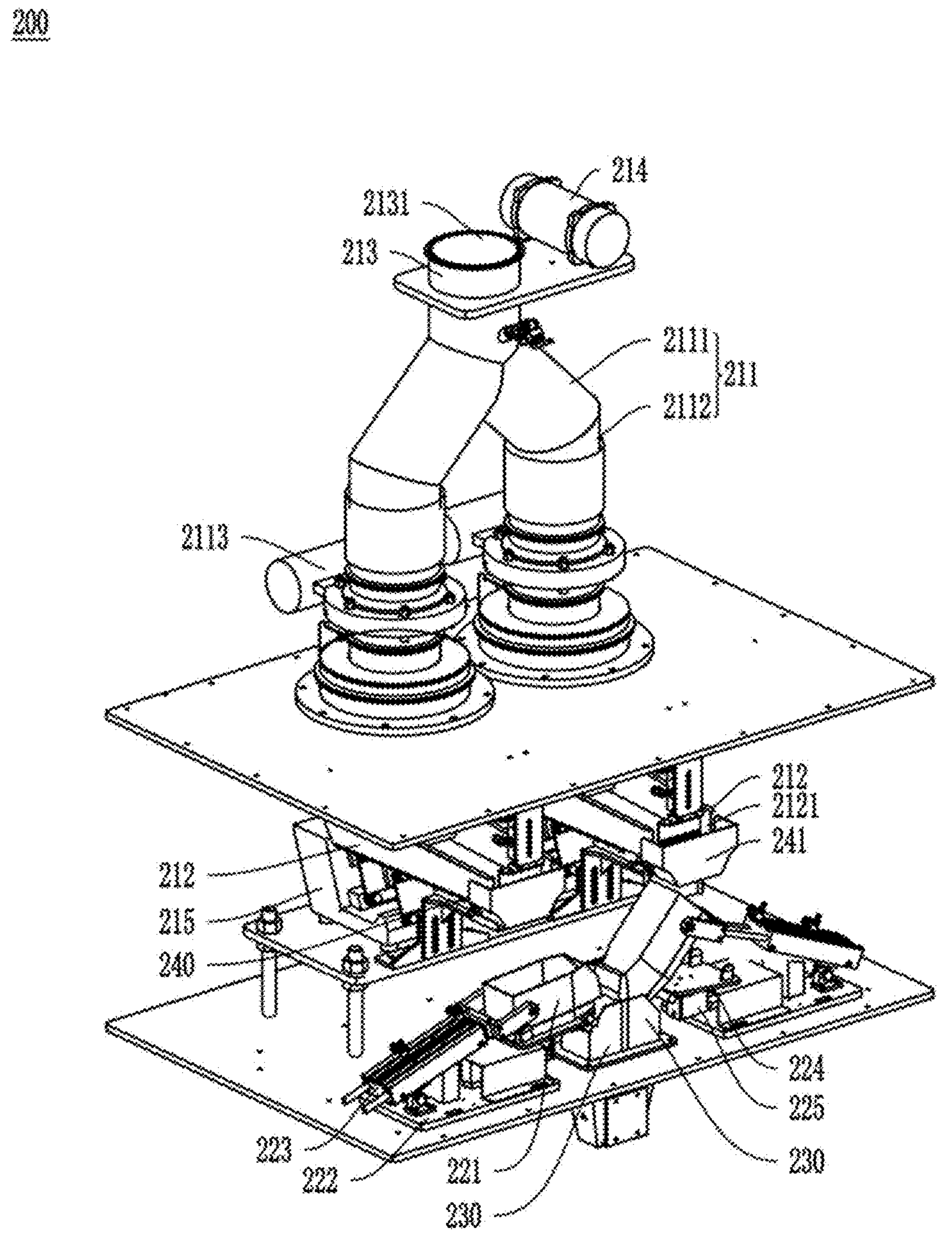
FIG. 4 is a schematic perspective structural view of the powder weighing device according to one embodiment of the invention.
Figure 5:
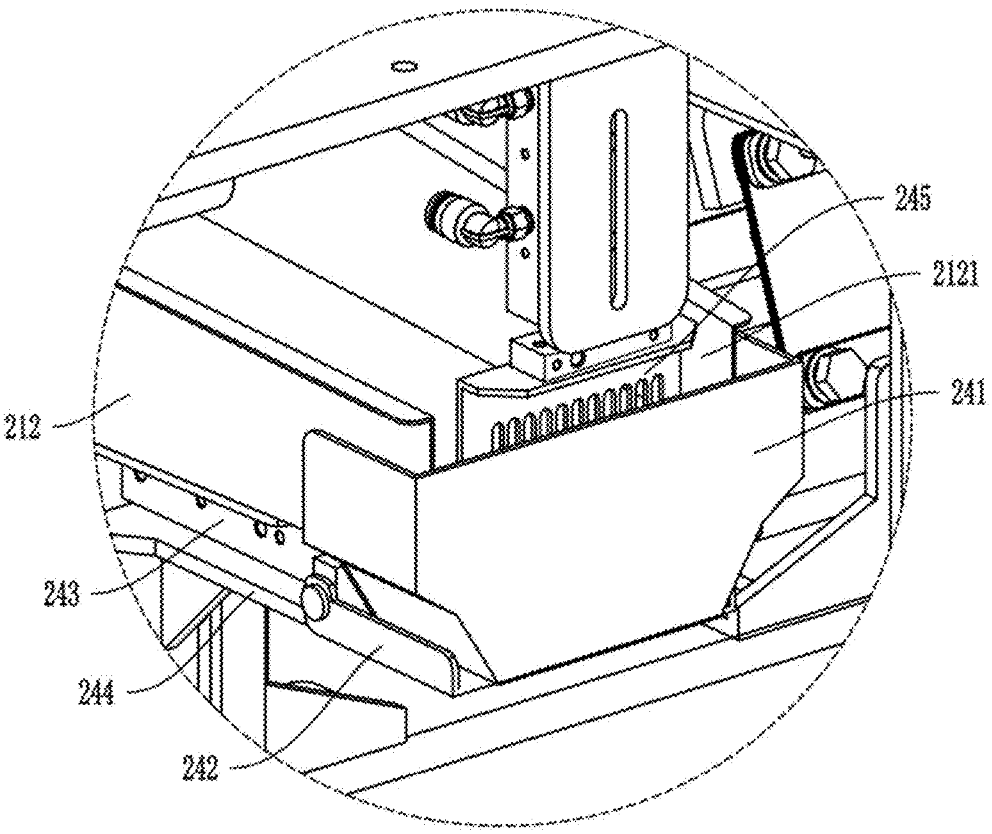
FIG. 5 is a schematic perspective structural view of a powder blocking mechanism in a case where an opening below a front powder blocking plate is closed according to one embodiment of the invention.
Figure 6:
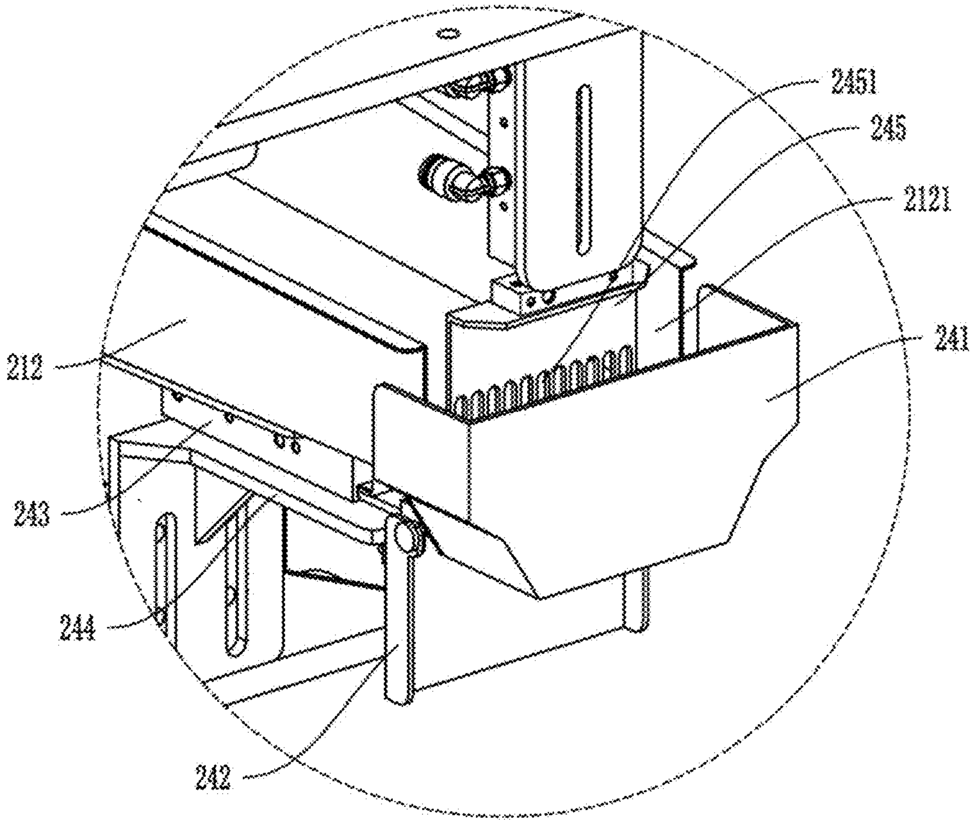
FIG. 6 is a schematic perspective structural view of the powder blocking mechanism in a case where the opening below the front powder blocking plate is opened according to one embodiment of the invention.

Referring to FIGS. 3 and 4, the powder weighing device 200 comprises a powder feeding mechanism 210, powder weighing mechanisms 220 and a powder discharge pipe 230. The powder feeding mechanism 210 comprises at least two feed pipes 211 and at least two feed hoppers 212, and the feed pipes 211 are connected to the feed hoppers 212 in one-to-one correspondence. The number of the powder weighing mechanisms 220 is the same as the number of the feed hoppers 212, and feed ports 2121 are formed in ends, away from the feed pipes 211, of the feed hoppers 212 and located above the powder weighing mechanisms 220 in one-to-one correspondence. The powder discharge pipe 230 is arranged between the powder weighing mechanisms 220, the powder feeding device is arranged below the powder discharge pipe 230, and each powder weighing mechanism 220 correspondingly pours powder into the powder feeding device by means of the powder discharge pipe 230. The powder conveying device 300 travels on the frame 100 and used for moving the powder feeding device to the forming device 500, and the forming device 500 is used for receiving powder from the powder feeding device and pressing the received powder.

When the powder weighing device 200 works, powder is fed into the powder weighing mechanisms 220 sequentially by means of the feed pipes 211 and the feed hoppers 212 of the powder feeding mechanism 210, and the powder weighing mechanisms 220 weigh the powder and then feed the weighed powder into the powder feeding device by means of the powder discharge pipe 230, such that a fixed quantity of powder is weighed. Wherein, at least two feed pipes 211 and at least two feed hoppers 212 are arranged and connected in one-to-one correspondence, and the powder weighing mechanisms 220 are in one-to-one correspondence with the feed hoppers 212, such that powder can be fed into at least two powder feeding mechanisms 220 by means of at least two feed pipes 211 and at least two feed hoppers 212, thus improving powder weighing efficiency. The powder discharge pipe 230 is arranged between the powder weighing mechanisms 220 to allow the powder weighing mechanisms 220 to pour powder into the powder feeding device, and two or more powder weighing mechanisms 220 can share one powder feeding device, that is, when one powder weighing mechanism 220 pours powder into the powder feeding device, the other powder weighing mechanism 220 receives powder from the corresponding feed hopper 212, such that the powder weighing device 200 can weigh powder continuously, thus improving processing efficiency.

Specifically, in this embodiment, the number of the feed pipes 211, the number of the feed hoppers 212 and the number of the powder weighing mechanisms 220 are all two. In addition, in other embodiments, the number of the feed pipes 211, the number of the feed hoppers 212 and the number of the powder weighing mechanisms 220 may be other suitable values.

Referring to FIGS. 3 and 4, ends, away from the feed hoppers 212, of the two feed pipes 211 (upper ends of the feed pipes 211) are connected to a discharge pipe 213, a discharge port 2131 is formed in an upper end of the discharge pipe 213, and powder is fed into the feed pipes 211 by means of the same discharge pipe 213. The discharge pipe 213 is externally connected to a vibration motor 214, and under the action of vibrations generated in operation of the vibration motor 214, powder can smoothly enter the feed pipes 211 from the discharge pipe 213.

Each feed pipe 211 comprises a first pipe section 2111 and a second pipe section 2112 which are connected from top to bottom, wherein the first pipe section 2111 is connected to the discharge pipe 213 and inclines downward in a direction away from the discharge pipe 213, the second 2112 is arranged vertically, and the corresponding feed hopper 212 is connected to the bottom of the second pipe section 2112. In this way, the discharge pipe 213 and the two first pipe sections 2111 are connected in a Y shape. There is sufficient space for two or more first pipe sections 2111 to be connected to a lower end of the discharge pipe 213. In addition, because the first pipe sections 2111 are arranged obliquely, powder in the first pipe sections 2111 can enter the second pipe sections 2112 under the action of self-weight or vibrations of the vibration motor 214 and is unlikely to be accumulated in the first pipe sections 2111, thus preventing the first pipe sections 2111 from being blocked.

Wherein, the second pipe section 2112 is a silicon hose or hoses made from other materials, such that the second pipes section 2112 can be easily connected to the first pipe section 2111.

Pneumatic butterfly valves 2113 are fixedly arranged on the two second pipe sections 2112. Specifically, each second pipe section 2112 is formed by an upper portion and a lower portion, and upper and lower ends of each pneumatic butterfly valve 2113 are connected to the corresponding second pipe section 2112 by means of flanges respectively. Valve spools of the pneumatic butterfly valves 2113 can rotate in the second pipe sections 2112 to change the flow areas of the second pipe sections 2112 so as to open or close the second pipe sections 2112.

Referring to FIGS. 3 and 4, each feed hopper 212 is a long trough component, an upper side of each feed hopper 212 is open, and a lower end of each second pipe section 2112 is located at one end of the upper side of the corresponding feed hopper 212. A feeding vibration mechanism 215 is connected to the bottom of each feed hopper 212. The feed ports 2121 are formed in ends, away from the second pipe sections 2112, of the feed hoppers 212. Inner bottom walls of the feed hoppers 212 incline downward in a direction close to the feed ports 2121 of the feed hoppers 212, that is, the inner bottom walls of the feed hoppers 212 incline downward from the second pipe sections 2112 to the feed ports 2121 of the feed hoppers 212, such that powder entering the feed hoppers 212 from the second pipe sections 2112 can flow to weighing boxes 221 via the feed ports 2121 of the feed hoppers 212 under the action of vibrations of the feeding vibration mechanisms 215.

Referring to FIGS. 3-6, a powder blocking mechanism 240 is arranged at each feed port 2121, and after the powder weighing mechanisms 220 weigh sufficient powder, the powder blocking mechanisms 240 block the feed ports 2121 to allow the powder weighing mechanisms 220 to pour the powder into the powder feeding device. Each powder blocking mechanism 240 comprises a front powder blocking plate 241, a lower powder blocking plate 242 and a blocking plate driving component, wherein the front powder blocking plate 241 surrounds the feed port 2121 of the corresponding feed hopper 212 in front and defines an opening facing downward to block powder in front to ensure that powder can only flow out via the opening below the front powder blocking plate 241; the lower powder blocking plate 242 is arranged below the front powder blocking plate 241 to block powder from below, and the front powder blocking plate 241 and the lower powder blocking plate 242 work together to block the corresponding feed port 2121; and the blocking plate driving component is connected to the lower powder blocking plate 242 and is able to drive the lower powder blocking plate 242 to move with respect to the front powder blocking plate 241 to open or close the opening below the front powder blocking plate 241 so as to open or close the corresponding feed port 2121.

Specifically, each blocking plate driving component comprises a push cylinder 243, and a support frame 244 is arranged below each feed hopper 212 and fixed to the frame 100. Cylinder bodies of the push cylinders 243 are fixed to the support frames 244. The lower powder blocking plates 242 are hinged to piston rods of the push cylinders 243, and the push cylinders 243 are able to push the lower powder blocking plates 242 to stretch out of the support frames 244.

Initially, the lower powder blocking plates 242 are located on and supported by the support frames 244 and located at the openings below the front powder blocking plates 241 to block the openings below the front powder blocking plates 241, such that powder in the feed hoppers 212 cannot enter the powder weighing mechanisms. When powder needs to be fed into the powder weighing mechanisms to be weighed, the piston rods of the push cylinders 243 drive the lower powder blocking plates 242 to move to stretch out of the support frames 244, and when not supported by the support frames 244, the lower powder blocking plates 242 rotate downward around hinge joints between the lower powder blocking plates 242 and the piston rods of the push cylinders 243 under the action of gravity to open the openings below the front powder blocking plates 241, and at this moment, powder can enter the powder weighing mechanisms from the feed hoppers 212. In this embodiment, the lower powder blocking plates 242 are rotatably opened to prevent powder from being accumulated on the lower powder blocking plates 242, thus guaranteeing the weighing accuracy of the powder weighing mechanisms 220. In addition, in other embodiments, the lower powder blocking plates 242 may be directly and fixedly connected to driving ends of the push cylinders 243, and the push cylinders 243 drive the lower powder blocking plates 242 to slide forward and backward to open or close the openings below the front powder blocking plates 241.

Wherein, each powder blocking mechanism 240 further comprises a powder blocking screen plate 245, which is driven by a vertical cylinder to be vertically and movably arranged at the corresponding feed port 2121, and multiple screen holes 2451 are formed in the powder blocking screen plate 245. The powder blocking screen plates 245 are used for screening powder flowing from the feed hoppers 212 to prevent large-sized powder from directly falling onto the powder weighing mechanisms 220, so as to prevent the weighing accuracy of the powder weighing mechanisms 220 from being affected. When the screen holes 2451 of the powder blocking screen plates 245 are blocked, the powder blocking screen plates 245 can be driven by the vertical cylinders to ascend to be away from the feed ports 2121 so as to be cleaned.

Referring FIGS. 3 and 4, each powder weighing mechanism 220 comprises a weighing box 221, a base 222 and a turning cylinder 223, wherein a cylinder body of the turning cylinder 223 is hinged to the base 222, and a piston rod of the turning cylinder 223 is hinged to the weighing box 221.

The base 222 is provided with a base plate 224 inclining downward in a direction away from the powder discharge pipe 230, and a weighing sensor 225 is connected to the bottom of the base plate 224. The weighing box 221 is placed on and hinged to the base plate 224, such that the weighing sensor 225 can weigh powder in the weighing box 221. An opening is formed in an end, away from the turning cylinder 223, of the weighing box 221, and the powder discharge pipe 230 is arranged below the opening of the weighing box 221.

After the weighing box 221 weighs sufficient powder, the piston rod of the turning cylinder 223 stretches out to drive the weighing box 221 to rotate around the base plate 224, such that powder in the weighing box 221 flows from the end, provided with the opening, of the weighing box 221 into the powder feeding device. Wherein, the base plate 224 inclines downward in a direction away from the powder discharge pipe 230, such that the weighing box 221 is oblique when placed on the base plate 224; and the opening of the weighing box 221 inclines upward, such that powder is unlikely to flow out via the opening of the weighing box 221 when weighed in the weighing box 221.

Figure 7:
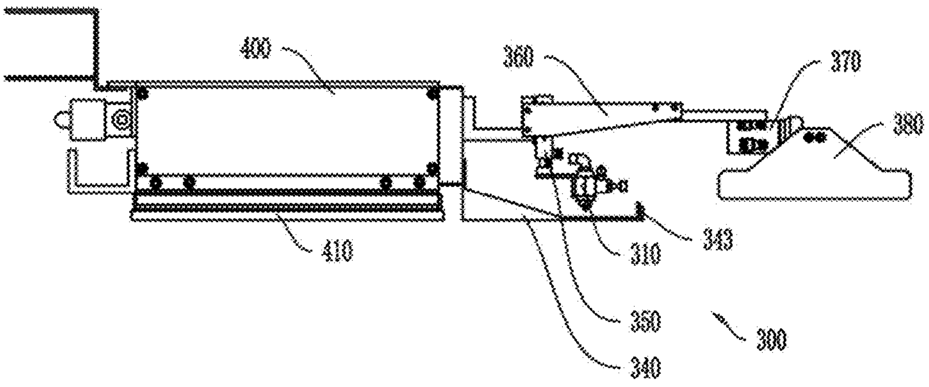
FIG. 7 is a schematic front structural view of a powder feeding trolley and a powder conveying device according to one embodiment of the invention.
Figure 8:
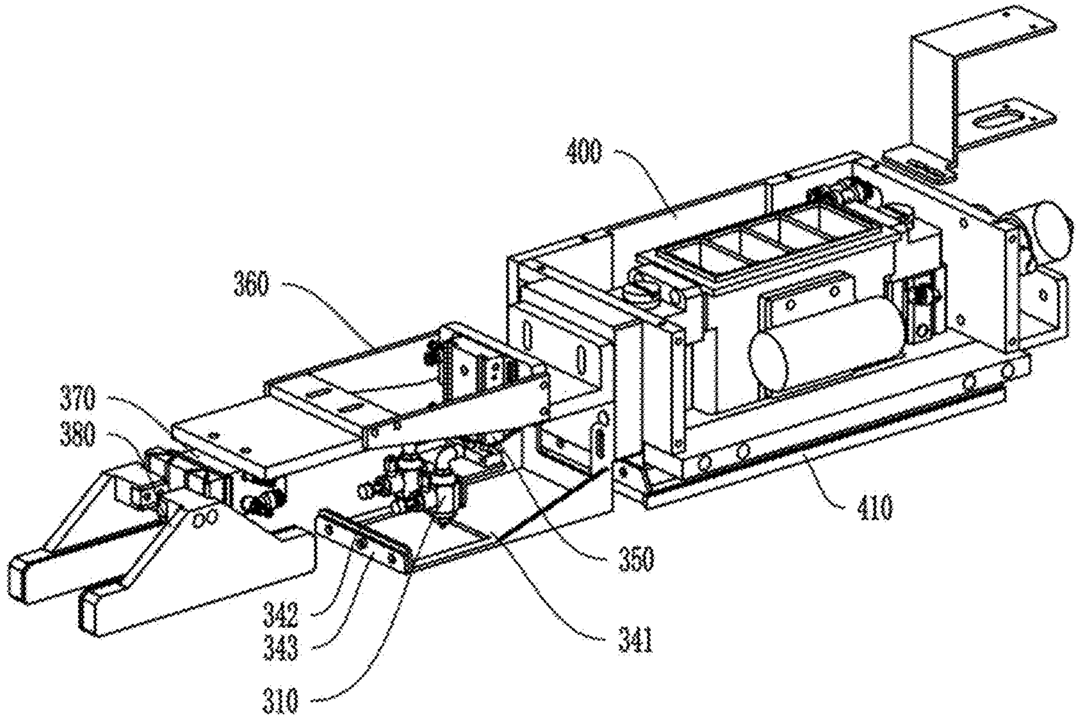
FIG. 8 is a schematic perspective structural view of the powder feeding trolley and the powder conveying device according to one embodiment of the invention.

Referring to FIGS. 2, 7 and 8, the powder conveying device 300 comprises release agent sprayers 310, a driving mechanism 320 and a trolley track 330. The powder feeding device comprises a feeding trolley 400. The trolley track 330 is fixed to the frame 100 and extends horizontally between the powder discharge pipe 230 and the forming device 500. A slider 410 matched with the trolley track 330 is arranged at the bottom of the feeding trolley 400, and the driving mechanism 320 is connected to the feeding trolley 400 and drives the feeding trolley 400 to move linearly to convey powder to the forming device 500.

In this embodiment, the driving mechanism 320 is a motor lead screw mechanism. In addition, in other embodiments, the driving mechanism may be a cylinder, a gear rack or other linear driving mechanisms.

The release agent sprayers 310 are arranged on the feeding trolley 400, face downward and are connected to a release agent container. When the feeding trolley 400 moves, the release agent sprayers 310 are driven to move and before the feeding trolley 400 feeds powder into the forming device 500, spray a release agent to a mold in the forming device 500 to facilitate demolding after a workblank is formed.

A mounting bracket 340 is connected to a front side of the feeding trolley 400, a lifting mechanism 350 is arranged on the mounting bracket 340, and the lifting mechanism 350 is connected to the release agent sprayers 310 and able to drive the release agent sprayers 310 to move vertically to adjust the height of the release agent sprayers 310 so as to adjust the release agent spraying range, thus improving the release agent spraying effect.

In this embodiment, the lifting mechanism 350 comprises a lifting cylinder, a sprayer mounting base is connected to an end of a piston rod of the lifting cylinder, and the release agent sprayers 310 are fixed to the sprayer mounting base.

Two or more release agent sprayers 310 are arranged, and all the release agent sprayers 310 are fixed to the same sprayer mounting base sequentially in a direction perpendicular to the movement direction of the feeding trolley 400. In this way, the release agent sprayers 310 can spray the release agent within a wider range.

In this embodiment, two release agent sprayers 310 are arranged specifically for illustration. In addition, in other embodiments, the number of the release agent sprayers 310 may be different.

A lower side plate 341 is arranged on a lower side of the mounting bracket 340 and connected to a side, away from the feeding trolley 400, of the mounting bracket 340, a front end plate 342 and wool felt 343 are arranged at an end, away from the feeding trolley 400, of the lower side plate 341, a lower end of the front end plate 342 is flush with the track below the feeding trolley 400, and the wool felt 343 is fixed to a side, away from the lower side plate 341, of the front end plate 342. The front end plate 342 and the wool felt 343 are connected to the end, away from the feeding trolley 400, of the lower side plate 341, and the front end plate 342 and the wool felt 342 can remove powder spilling onto the trolley track 330 when the feeding trolley 400 moves, thus guaranteeing the sanitary environment of the fully automatic press 1000 and the moving stability of the feeding trolley 400. The front end plate 342 is vertically and perpendicularly arranged at a front end of the lower side plate 341, and the wool felt 343 is supported by the front end plate 342. The wool felt 343 can adsorb powder spilling out of the feeding trolley 400 to better remove powder on the track.

Figure 9:
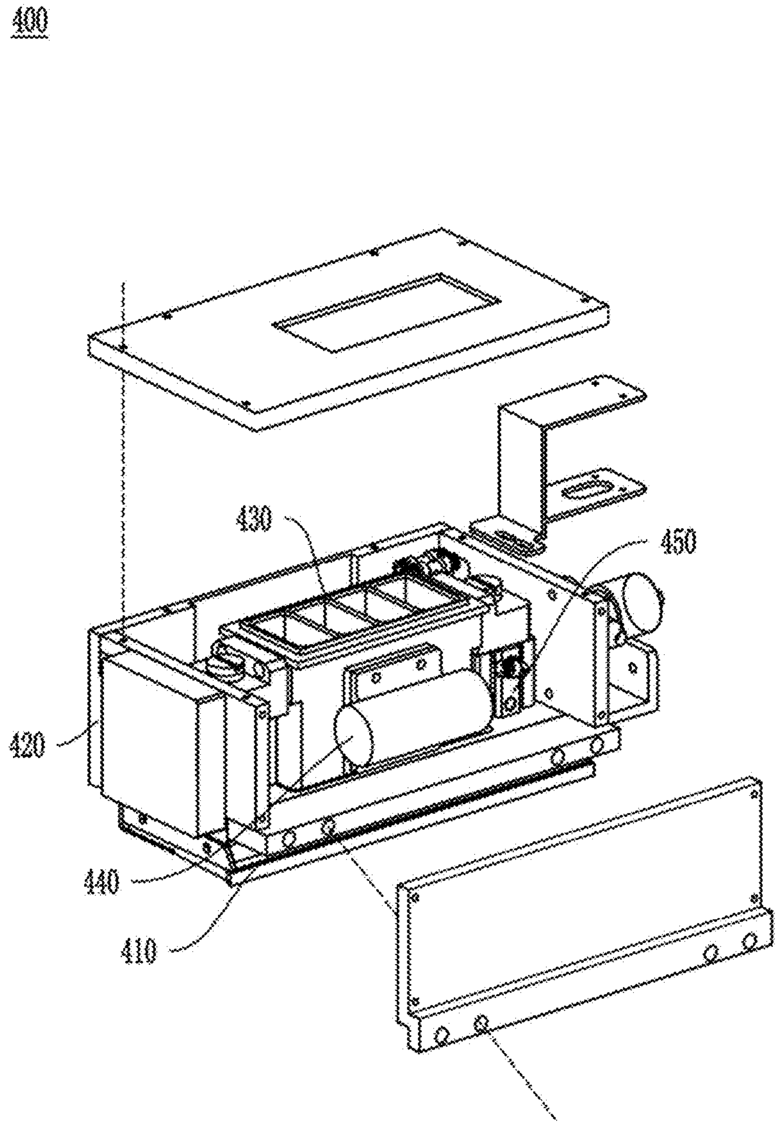
FIG. 9 is a schematic exploded structural view of the powder feeding trolley according to one embodiment of the invention.
Figure 10:
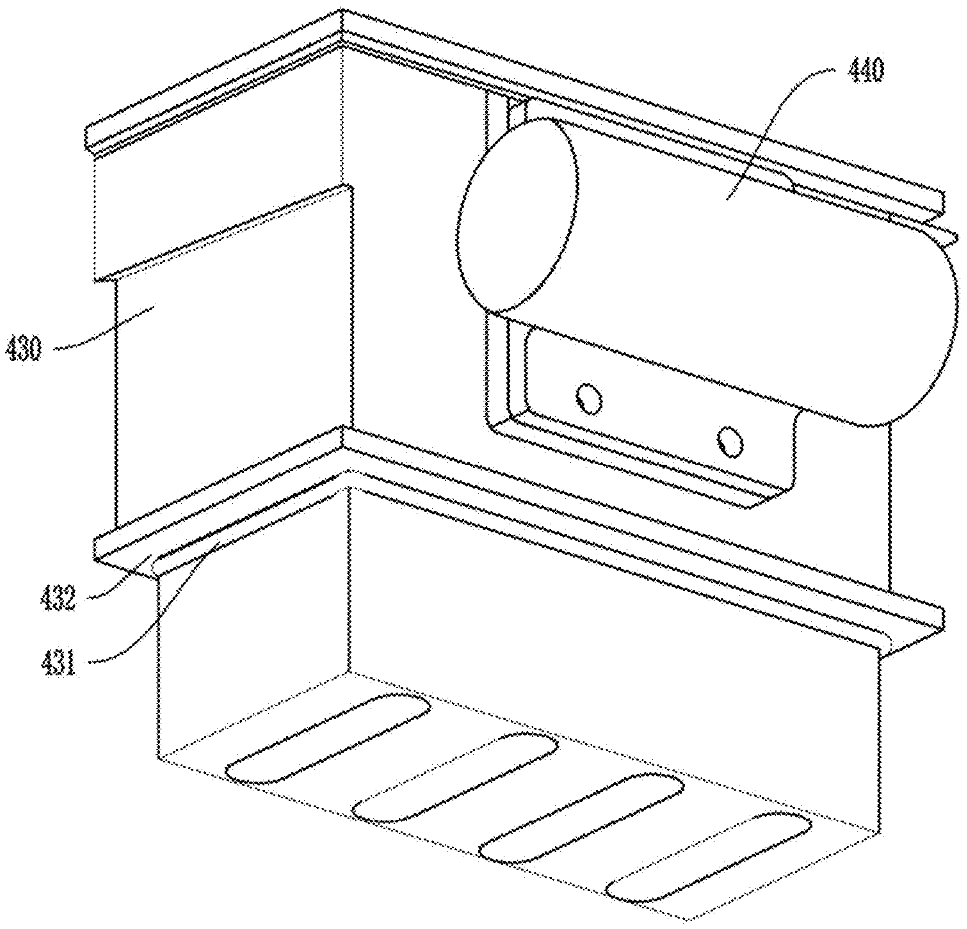
FIG. 10 is a schematic perspective structural view of a powder bin and a trolley vibration mechanism according to one embodiment of the invention.
Figure 11:
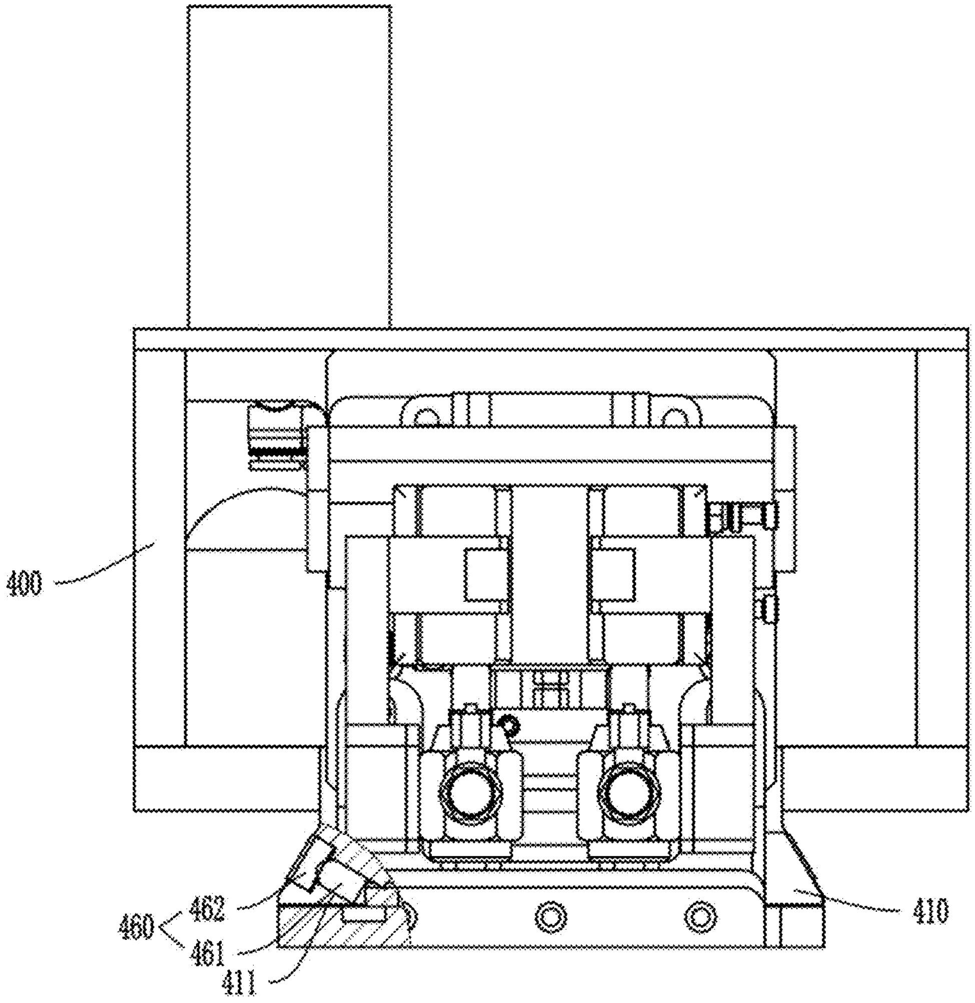
FIG. 11 is a schematic sectional structural view of a shock absorption assembly according to one embodiment of the invention.

Referring to FIGS. 9-11, the feeding trolley 400 comprises a feeding box frame 420, a powder bin 430, a trolley vibration mechanism 440 and a pressing mechanism 450. A receiving cavity for receiving powder is formed in the powder bin 430. The powder bin 430, the trolley vibration mechanism 440 and the pressing mechanism 450 are all mounted in the feeding box frame 420. A notch is formed in a lower side of the feeding box frame 420, a lower portion of the powder bin 430 is fitted and mounted in the notch in the lower side of the feeding box frame 420, and the trolley vibration mechanism 440 is connected to the powder bin 430 and drives the powder bin 430 to vibrate, such that powder can smoothly enter the forming device 500 from the powder bin 430. The pressing mechanism 450 is connected to the powder bin 430 and provides a downward pressure for the powder bin 430 to ensure that the lower portion of the powder bin 430 is stably fitted in the notch in the lower side of the feeding box frame 420, such that the powder bin 430 is unlikely to collide with the feeding box frame 420 when vibrating.

In this embodiment, the pressing mechanism 450 comprises two pressing cylinders arranged at two ends of the powder bin 430, cylinder bodies of the pressing cylinders are fixed to a bottom wall of the feeding box frame 420, and piston rods of the pressing cylinders are fixedly connected to an outer wall of the powder bin 430. In this way, when the piston rods of the pressing cylinders retreat, the powder bin 430 can be driven to move downward to be firmly pressed in the feeding box frame 420.

Wherein, a lower seam 432 is circumferentially arranged on a lower portion of the powder bin 430 and limited above the notch of the feeding box frame 420. The lower seam 432 and the notch of the feeding box frame 420 work together to realize tight fit between the powder bin 430 and the feeding box frame 420.

A flexible sealing ring 431 is circumferentially inlaid in the lower seam 432 and abuts against an edge of the lower seam 432 and an edge of the notch of the feeding box frame 420. The flexible sealing ring 431 is inlaid in the lower seam 432 and abuts against the edge of the lower seam 432 and the edge of the notch of the feeding box frame 420, such that a shock absorption and buffer effect can be fulfilled when the powder bin 430 vibrates, and powder spilling out of the powder bin 430 is unlikely to enter the lower seam 432 and the notch of the feeding box frame 420 and thus will not affect the fit between the powder bin 430 and the feeding box frame 420.

A mounting groove 411 is formed in the slider 410, and a shock absorption assembly 460 is mounted in the mounting groove 411. The shock absorption assembly 460 comprises a spring plunger 461 and an abutting head 462, a plunger head of the spring plunger 461 abuts against an inner side of the abutting head 462, and at least part of the abutting head 462 is able to stretch out of the mounting groove 411 and is driven by the spring plunger 461 to abut against an inner wall of the trolley track 330. The spring plunger 461 can drive the abutting head 462 to abut against the inner wall of the trolley track 330, such that when the powder bin 430 vibrates, energy transferred onto the powder feeding device can be converted into elastic energy of the spring plunger 461 to fulfill a buffer effect to avoid collisions between the slider 410 and the track, thus ensuring stable operation of the powder feeding device and reducing abrasion of the feeding trolley 400 and the trolley track 330.

Preferably, the abutting head 462 is made from copper, such that the strength and ductility of the abutting head 462 are guaranteed. A PTFE gasket is arranged on an outer side of the abutting head 462 to protect the abutting head 462 against abrasion.

In this embodiment, the slider 410 is a dovetail block, the spring plunger 461 is perpendicular to a side face of the slider 410, and a surface of the abutting head 462 is parallel to the side face of the slider 410. Therefore, the elastic force from the spring plunger 461 can be stably applied to the abutting head 462 to allow the abutting head 462 to stably abut against the inner wall of the trolley track.

Referring to FIGS. 7 and 8, an extension arm 360 is connected to a front end of the powder conveying device 300, a pneumatic claw 370 and two clamping arms 380 are fixed to the extension arm 360, and the pneumatic claw 370 is connected to the clamping arms 380 and drives the clamping arms 380 to move close to or away from each other, such that a workblank formed by the forming device 500 can be taken out.

Referring to FIGS. 1 and 2, in this embodiment, the forming device 500 comprises an upper electric cylinder 510, an upper guide plate 520, an upper mold 530, a forming mold 540, a lower mold 550, a lower guide plate 560 and a lower electric cylinder 570 which are sequentially arranged from top to bottom. The upper electric cylinder 510 drives the upper mold 530 to move downward, the lower electric cylinder 570 drives the lower mold 550 to move upward, the upper mold 530 and the lower mold 550 act on the forming mold 540 to press powder in the forming mold 540, and the upper guide plate 520 and the lower guide plate 560 are movably connected to the upper mold 530 and the lower mold 550 respectively to fulfill a guide effect.

The forming device 500 is externally connected to a conveying mechanism 600 and a glove box 700, the conveying mechanism 600 is arranged between the forming device 500 and the glove box 700, and a formed workblank is conveyed by the conveying mechanism 600 to the glove box 700 to be packaged.

The above embodiments are merely preferred ones of the invention, and all equivalent transformations or modifications made according to the structures, features and principles within the patent application range of the invention should fall within the patent application range of the invention.

What is claimed is:

1. A fully automatic press, wherein the fully automatic press (1000) comprises a frame (100), a powder weighing device (200), a powder conveying device (300), a powder feeding device and a forming device (500), and the powder weighing device (200), the powder conveying device (300), the powder feeding device and the forming device (500) are all arranged on the frame (100);

the powder weighing device (200) comprises a powder feeding mechanism (210), powder weighing mechanisms (220) and a powder discharge pipe (230); the powder feeding mechanism (210) comprises at least two feed pipes (211) and at least two feed hoppers (212), and the at least two feed pipes (211) are connected to the at least two feed hoppers (212) in one-to-one correspondence; the number of the powder weighing mechanisms (220) is the same as the number of the at least two feed hoppers (212), feed ports (2121) are formed in ends, away from the at least two feed pipes (211), of the at least two feed hoppers (212), and the feed ports (2121) are located above the powder weighing mechanisms (220) in one-to-one correspondence;

the powder discharge pipe (230) is arranged between the powder weighing mechanisms (220), the powder feeding device is arranged below the powder discharge pipe (230), and each said powder weighing mechanism (220) is able to correspondingly pour powder into the powder feeding device by means of the powder discharge pipe (230); the powder conveying device (300) travels on the frame (100) to move the powder feeding device to the forming device (500), and the forming device (500) is used for receiving the powder from the powder feeding device and pressing the received powder;

wherein the powder conveying device (300) comprises release agent sprayers (310), a driving mechanism (320) and a trolley track (330), the powder feeding device comprises a feeding trolley (400), a slider (410) matched with the trolley track (330) is arranged at a bottom of the feeding trolley (400), and the driving mechanism (320) is connected to the feeding trolley (400) and drives the feeding trolley (400) to move linearly; the release agent sprayers (310) are arranged on the feeding trolley (400) and face downward;

a mounting bracket (340) is connected to a front side of the feeding trolley (400), a lifting mechanism (350) is arranged on the mounting bracket (340), and the lifting mechanism (350) is connected to the release agent sprayers (310) and able to drive the release agent sprayers (310) to move vertically;

wherein the feeding trolley (400) comprises a feeding box frame (420), a powder bin (430), a trolley vibration mechanism (440) and a pressing mechanism (450); a receiving cavity for receiving the powder is formed in the powder bin (430), and a notch is formed in a lower side of the feeding box frame (420); the powder bin (430), the trolley vibration mechanism (440) and the pressing mechanism (450) are all mounted in the feeding box frame (420), a lower portion of the powder bin (430) is fitted and mounted in the notch in the lower side of the feeding box frame (420), the trolley vibration mechanism (440) is connected to the powder bin (430) and drives the powder bin (430) to vibrate, and the pressing mechanism (450) is connected to the powder bin (430) and provides a downward pressure for the powder bin (430).

2. The fully automatic press according to claim 1, wherein ends, away from the at least two feed hoppers (212), of the at least two feed pipes (211) are connected to a discharge pipe (213), a discharge port (2131) is formed in an upper end of the discharge pipe (213), and the discharge pipe (213) is externally connected to a vibration motor (214); each said feed pipe (211) comprises a first pipe section (2111) and a second pipe section (2112) which are connected from top to a bottom, the first pipe section (2111) is connected to the discharge pipe (213) and inclines downward in a direction away from the discharge pipe (213), the second pipe section (2112) is arranged vertically, and the corresponding feed hopper (212) is connected to a bottom of the second pipe section (2112).

3. The fully automatic press according to claim 1, wherein a powder blocking mechanism (240) is arranged at each said feed port (2121) and comprises a front powder blocking plate (241), a lower powder blocking plate (242) and a blocking plate driving component, the front powder blocking plate (241) surrounds the feed port (2121) of the corresponding feed hopper (212) and defines an opening facing downward, the lower powder blocking plate (242) is arranged below the front powder blocking plate (241), and the blocking plate driving component is connected to the lower powder blocking plate (242) and is able to drive the lower powder blocking plate (242) to move with respect to the front powder blocking plate (241) to open or close the opening below the front powder blocking plate (241).

4. The fully automatic press according to claim 3, wherein the blocking plate driving component comprises a push cylinder (243), a support frame (244) is arranged below each said feed hopper (212), and a cylinder body of the push cylinder (243) is fixed to the corresponding support frame (244); the lower powder blocking plate (242) is hinged to a piston rod of the push cylinder (243), and the push cylinder (243) is able to push the lower powder blocking plate (242) to stretch out of the corresponding support frame (244);

the powder blocking mechanism (240) further comprises a powder blocking screen plate (245), which is driven by a vertical cylinder to be vertically and movably arranged at the corresponding feed port (2121), and multiple screen holes (2451) are formed in the powder blocking screen plate (245).

5. The fully automatic press according to claim 1, wherein each said powder weighing mechanism (220) comprises a weighing box (221), a base (222) and a turning cylinder (223), a cylinder body of the turning cylinder (223) is hinged to the base (222), and a piston rod of the turning cylinder (223) is hinged to the weighing box (221);

the base (222) is provided with a base plate (224) inclining downward in a direction away from the powder discharge pipe (230), and the weighing box (221) is hinged to the base plate (224); an opening is formed in an end, away from the turning cylinder (223), of the weighing box (221), and the powder discharge pipe (230) is arranged below the opening of the weighing box (221).

6. The fully automatic press according to claim 1, wherein a lower side plate (341) is arranged on a lower side of the mounting bracket (340) and connected to a side, away from the feeding trolley (400), of the mounting bracket (340), a front end plate (342) and wool felt (343) are arranged at an end, away from the feeding trolley (400), of the lower side plate (341), a lower end of the front end plate (342) is flush with the trolley track (330) below the feeding trolley (400), and the wool felt (343) is fixed to a side, away from the lower side plate (341), of the front end plate (342).

7. The fully automatic press according to claim 1, wherein a lower seam (432) is circumferentially arranged on a lower portion of the powder bin (430) and limited above the notch of the feeding box frame (420), and a flexible sealing ring (431) is circumferentially inlaid in the lower seam (432) and abuts against an edge of the lower seam (432) and an edge of the notch of the feeding box frame (420).

8. The fully automatic press according to claim 1, wherein a mounting groove (411) is formed in the slider (410), a shock absorption assembly (460) is mounted in the mounting groove (411) and comprises a spring plunger (461) and an abutting head (462), a plunger head of the spring plunger (461) abuts against an inner side of the abutting head (462), and at least part of the abutting head (462) is able to stretch out of the mounting groove (411) and is driven by the spring plunger (461) to abut against an inner wall of the trolley track (330).

* * * * *